(12) United States Patent
Adcock et al.

(10) Patent No.: US 12,229,745 B2
(45) Date of Patent: Feb. 18, 2025

(54) SYSTEMS AND METHODS FOR LOCATION-BASED APPLICATIONS FOR VEHICLES

(71) Applicant: Capital One Services, LLC, McLean, VA (US)

(72) Inventors: Lee Adcock, Midlothian, VA (US); Mehulkumar Jayantilal Garnara, Glen Allen, VA (US); Vamsi Kavuri, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 154 days.

(21) Appl. No.: 18/185,335

(22) Filed: Mar. 16, 2023

(65) Prior Publication Data

US 2024/0311795 A1   Sep. 19, 2024

(51) Int. Cl.
| | |
|---|---|
| *G06Q 20/32* | (2012.01) |
| *B60K 35/00* | (2024.01) |
| *B60K 35/10* | (2024.01) |
| *B60K 35/28* | (2024.01) |
| *B60K 35/85* | (2024.01) |

(52) U.S. Cl.
CPC ......... *G06Q 20/3223* (2013.01); *B60K 35/00* (2013.01); *G06Q 20/327* (2013.01); *B60K 35/10* (2024.01); *B60K 35/28* (2024.01); *B60K 35/85* (2024.01); *B60K 2360/146* (2024.01); *B60K 2360/16* (2024.01); *B60K 2360/334* (2024.01); *B60K 2360/589* (2024.01)

(58) Field of Classification Search
CPC .. G06Q 20/327; G06Q 20/3223; B60K 35/00; B60K 2360/146; B60K 35/28; B60K 2360/334; B60K 2360/589; B60K 35/85; B60K 35/10; B60K 2360/16
See application file for complete search history.

(56) References Cited

U.S. PATENT DOCUMENTS

| | | | | |
|---|---|---|---|---|
| 10,402,143 | B2 * | 9/2019 | Amaru | B60K 35/00 |
| 11,423,816 | B2 * | 8/2022 | Couillard | G09G 3/03 |
| 11,453,274 | B2 * | 9/2022 | Costa | B60H 1/00771 |
| 11,701,968 | B2 * | 7/2023 | Zhao | H03K 17/962 362/488 |
| 11,833,965 | B2 * | 12/2023 | Foote | B60R 1/04 |
| 11,899,865 | B2 * | 2/2024 | Cleary | G06F 3/041 |

(Continued)

*Primary Examiner* — Vinh T Lam
(74) *Attorney, Agent, or Firm* — Foley & Lardner LLP

(57) ABSTRACT

Methods and systems for location-based triggering of an electrically switchable glass of a vehicle for use in interactive applications. In some aspects, a system may be used to initiate an interactive application at the vehicle via electrically switchable glass of the vehicle. The system determines that the vehicle is at a location configured for an interactive application, and based on the location of the vehicle, triggers opacity of a portion of the electrically switchable glass. The system determines, based on a position and orientation of the electrically switchable glass, an image projector device having an angle of projection closest to perpendicular to a plane of the electrically switchable glass. The system may calibrate parameters of the image projector device and generate an image for projection using data corresponding to the interactive application. The system projects the first image onto the electrically switchable glass using the image projector device.

20 Claims, 5 Drawing Sheets

(56) References Cited

U.S. PATENT DOCUMENTS

| | | | |
|---|---|---|---|
| 11,904,665 B2* | 2/2024 | Salter | B32B 17/10504 |
| 12,084,084 B2* | 9/2024 | Ferguson | G06Q 50/40 |
| 2020/0269663 A1* | 8/2020 | Urano | B60J 1/2011 |
| 2020/0398648 A1* | 12/2020 | Dernotte | B60H 1/00814 |
| 2021/0026134 A1* | 1/2021 | Harkins | B60K 35/60 |
| 2021/0094394 A1* | 4/2021 | Costa | G01S 3/7862 |
| 2022/0114362 A1* | 4/2022 | Kim | G06V 20/59 |
| 2022/0135073 A1* | 5/2022 | Ferguson | B60J 1/02 |
| | | | 701/25 |
| 2024/0012303 A1* | 1/2024 | Shen | G02F 1/133615 |
| 2024/0038132 A1* | 2/2024 | Salter | B60K 35/29 |

\* cited by examiner

SYSTEMS AND METHODS FOR LOCATION-BASED APPLICATIONS FOR VEHICLES

SUMMARY

Vehicles enable drivers and passengers expedient and convenient access to various functionalities. Drive-through experiences for vehicles allow for car passengers to interact with drive-through attendants or screens to perform various functions, such as placing orders or accessing banking information, at different entities such as banks, fast food restaurants, or pharmacies. However, while conventional drive-through systems provide some convenience and comfort over going into a store or establishment, there are still many limitations.

For example, many conventional drive-through systems can be difficult and uncomfortable to use. Depending on the design of the drive-through, it may be hard for users to interact with a drive-through attendant and/or screen to provide instruction or to provide payment (e.g., hand over a credit card and/or wireless payment using near-field communication (NFC)). For example, if a user is hearing-impaired, it may be difficult for a user to provide or understand information regarding an order or payment in a conversation with an attendant.

In particular, conventional drive-through systems lack safety and privacy and may be the target of crime. For example, many drive-throughs, such as those for an automated teller machine (ATM), require users to interact and input sensitive information (e.g., personal identification number (PIN), password, etc.) into a screen external to the vehicle, which makes users vulnerable to crime. Drive-throughs may also require users to keep vehicle windows open for extended periods of time, exposing passengers to crime as well.

Accordingly, a mechanism is desired that would enable individuals to perform various functionalities securely, such as within a vehicle, without the shortcomings of traditional drive-through systems. One mechanism to enable individuals to perform various functions within a vehicle may use interactive applications at a vehicle glass of the vehicle, e.g., at an electrically switchable glass of the vehicle.

Therefore, methods and systems are described herein for enabling interactive applications, such as vehicle drive-through experiences (e.g., pharmacy, ATM, fast food restaurants, etc.) using electrically switchable glass (e.g., smart glass, private glass, etc.) of a vehicle. In particular, the location of a vehicle (e.g., as detected by a camera, etc.) automatically triggers opacity of a portion of vehicle glass (e.g., windscreens, side/rear windows, glass panel roofs, etc.). A projector may project information such as display screens corresponding to the interactive application (e.g., such as an ATM user interface for completing an ATM transaction). Additionally, a camera may be equipped to detect a user's movement interacting with the projected image and/or electrically switchable glass and interpret the user's movement as user inputs. An interactive application system may be used to perform operations described herein.

In particular, the interactive application system may determine that a vehicle is at a location configured for an interactive application, where the vehicle comprises electrically switchable glass. For example, the interactive application system may receive a signal and/or determine that the vehicle is at the location by detecting the vehicle using a camera. The interactive application system may determine, based on a position and an orientation of the electrically switchable glass, an image projector device from a plurality of image projector devices having an angle of projection closest to perpendicular to a plane of the electrically switchable glass of the vehicle. The system may calibrate, based on the position and the orientation of the electrically switchable glass, one or more imaging parameters of the image projector device and generate, using data corresponding to the interactive application, a display image for projection. The interactive application system may project, using the image projector device, the display image onto the electrically switchable glass.

According to some embodiments, the image includes one or more interactive elements associated with corresponding portions of the electrically switchable glass. The interactive application system may determine, using at least one imaging device, a user contact with a portion of the electrically switchable glass corresponding to an interactive element. Based on the portion of the electrically switchable glass, the interactive application system may transmit, to the remote server, an indication of the interactive element for triggering execution of one or more commands by the interactive application.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
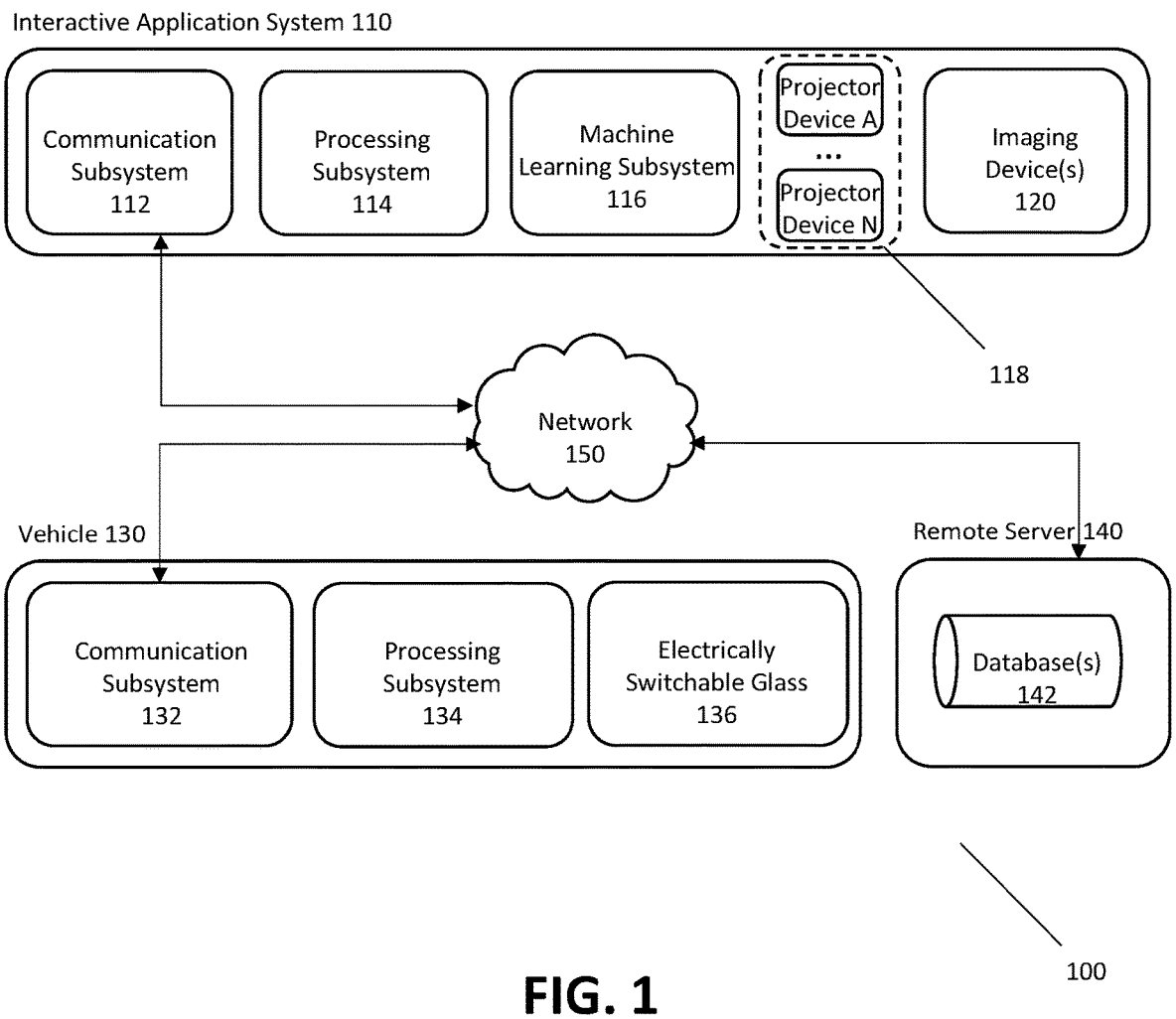
FIG. 1 shows an illustrative system for location-based triggering of an electrically switchable glass of a vehicle, in accordance with one or more embodiments of this disclosure.

FIG. 1 is an example of environment 100 for location-based triggering of an electrically switchable glass of a vehicle. Environment 100 includes interactive application system 110, vehicle 130, remote server 140, and network 150. Interactive application system 110, vehicle 130, and remote server 140 may be in communication via the network 150. Network 150 may be a wired or wireless connection such as via a local area network, a wide area network (e.g., the Internet), or a combination thereof.

Interactive application system 110 may include communication subsystem 112, processing subsystem 114, machine learning subsystem 116, projector(s) 118, and imaging device(s) 120. Interactive application system 110 may execute instructions for location-based triggering of an electrically switchable glass of a vehicle 130 and implementing an interactive application at vehicle 130.

For example, according to some embodiments, interactive application system 110 may transmit a signal for triggering opacity of the electrically switchable glass 136 of the vehicle 130, e.g., in response to detecting the vehicle, such as identifying the vehicle within a location configured for an interactive application from an image. For example, the interactive application system 110 may obtain, using imaging device(s) 120, one or more images of a location. In response to determining a presence of a vehicle, such as vehicle 130, in the one or more images of the location, the interactive application system 110 may transmit a signal for triggering opacity of the electrically switchable glass 136 via communication subsystem 112.

Communication subsystem 112 of interactive application system 110 may include software and/or hardware components allowing for the transmission and/or receipt of information between two or more devices. For example, the communication subsystem 112 may include a wireless communication module, such as a cellular radio or Wi-Fi antenna, to allow for communication over wireless networks, and/or may include a network card (e.g., a wireless network card and/or a wired network card) that is associated with software to drive the card.

When interactive application system 110 transmits the signal for triggering opacity of the electrically switchable glass 136 via communication subsystem 112, the communication subsystem 132 of vehicle 130 may receive the signal. Communication subsystem 132 of vehicle 130 may also include software and/or hardware components allowing for the transmission and/or receipt of information between two or more devices (e.g., a wireless communication module, such as a cellular radio or Wi-Fi antenna, a network card). Communication subsystem 132 may pass at least a portion of the data included in the signal to trigger opacity to other subsystems such as processing subsystem 134, and/or to electrically switchable glass 136.

The communication subsystem 132 may pass at least a portion of the data included in the signal to processing subsystem 134 which may then pass a signal to electrically switchable glass 136 to trigger opacity of electrically switchable glass. As referred to herein, electrically switchable glass, also known as "smart glass" or "dynamic glass," may refer to glass that can change its transparency (also referred to herein as opacity) or reflectivity in response to an electrical current. Some examples of electrically switchable glass may include electrochromic glass (e.g., glass that uses an electrochemical reaction to change its tint or transparency in response to an electrical current), liquid crystal glass (e.g., glass which uses liquid crystals suspended in a transparent film to change its transparency in response to an electrical current), suspended particle device (SPD) glass (e.g., glass that uses particles suspended in a liquid to change its transparency in response to an electrical current), and photochromic glass (e.g., glass that changes its tint or transparency in response to ultraviolet (UV) radiation). For example, electrically switchable glass may use an electrical current to change a physical property of the glass, such as alignment of liquid crystals or particles, to alter its transparency or reflectivity. The electrically switchable glass may be located anywhere on the vehicle, such as on the windscreens, side/rear windows, or glass panel roofs. The electrically switchable glass may be overlaid over automotive glass, between layers of automotive glass, and/or the like.

Additionally, or alternatively, rather than triggering opacity of electrically switchable glass 136 of vehicle 130 in response to a signal received from the interactive application system 110, the vehicle 130 may trigger opacity of the electrically switchable glass, e.g., in response to determining that the vehicle is at a location configured for an interactive application. For example, the vehicle 130 may use global navigation satellite systems (GNSS), such as GPS to determine whether or not the vehicle 130 is at a location configured for an interactive application. The vehicle 130 may additionally (or alternatively) use any combination of inertial navigation systems (e.g., accelerometers, gyroscopes), dead reckoning, radar, lidar, cameras, and/or the like, to improve accuracy and/or reliability of their location estimates. The vehicle may then use communication subsystem 132 to transmit a signal initiating an interactive application to the interactive application system 110 (e.g., via communication subsystem 112). The interactive application system 110 may receive the signal initiating the interactive application and use the signal to detect that a vehicle is at a location configured for an interactive application.

Interactive application system 110 may determine parameters (e.g., a position and orientation) of the electrically switchable glass of the vehicle, e.g., in preparation for projecting elements of the interactive application onto the electrically switchable glass. For example, once the interactive application system determines that a vehicle is at a location configured for an interactive application, the system may subsequently determine parameters such as a location, position, orientation, size, and/or the like so that the system may configure the projector(s) and/or images to be projected.

According to some examples, the interactive application system 110 may process, using a machine learning model, one or more images of the vehicle to obtain information regarding parameters of the electrically switchable glass of the vehicle. For example, the interactive application system may input into one or more machine learning models included in machine learning subsystem 116 one or more images obtained using imaging device(s) 120 to obtain information regarding parameters (e.g., position, orientation) of the electrically switchable glass of the vehicle. The machine learning model may be trained on images of vehicles that have electrically switchable glass and may be trained to recognize a type of vehicle and location(s) of electrically switchable glass on the type of vehicle. The machine learning (ML) model may also be trained to determine a position and orientation of the electrically switchable glass with respect to the imaging device(s) 120. For example, the ML model may determine that the vehicle is of a particular brand, known to have electrically switchable glass on a right front side window, and that the electrically switchable glass is at a specific distance and angle from the imaging device(s) 120. Alternatively and/or additionally, the interactive application system 110 may use images obtained from imaging device(s) 120 to determine a position and orientation of the electrically switchable glass.

Interactive application system 110 may determine, based on a position and an orientation of the electrically switchable glass of the vehicle, an image projector device from a plurality of image projector devices having an optimal angle of projection (e.g., closest to perpendicular to a plane of the electrically switchable glass of the vehicle, at a specific angle different from perpendicular to the plane). For example, based on the determined position and orientation of the electrically switchable glass 136 of vehicle 130 and based on a relative position and orientation of the imaging device(s) 120 to each of projector devices 118A-N, the processing subsystem 114 may determine the position and orientation of the projector devices 118A-N to the electrically switchable glass 136 of the vehicle. The system may then determine an image projector device from image projector devices 118A-N having an optimal angle of projection (e.g., closest to perpendicular to a plane of the electrically switchable glass 136 of the vehicle 130).

The interactive application system 110 may calibrate the selected image projector device. For example, based on the position and the orientation of the electrically switchable glass, the system may calibrate one or more imaging parameters of the image projector device. Some examples of imaging parameters include brightness, contrast, color, sharpness, keystone correction, zoom, focus and aspect ratio. Other examples may include altering an angle of projection of the image projector device, and calibrating a color saturation, and/or a color hue of the image projector device.

The interactive application system 110 may generate, using data corresponding to the interactive application, a first image for projection. For example, the interactive application system 110 may retrieve from remote server 140, data corresponding to the interactive application (e.g., via communication subsystem 112 and processing subsystem 114) and may use the data to generate the first image. The data may be retrieved by querying database(s) 142. The first image may be projected onto the electrically switchable glass 136 of the vehicle 130 using the image projector device.

Figure 2A:
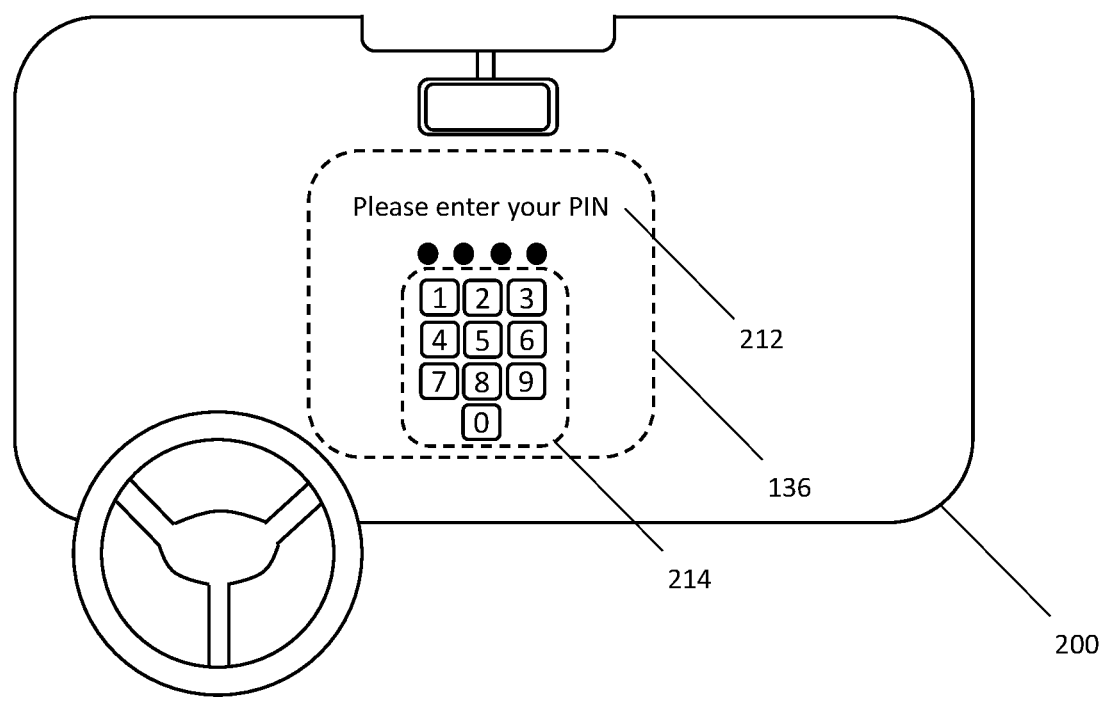
FIG. 2A illustrates an example of a user interface for an interactive application at an electrically switchable glass of a vehicle, in accordance with one or more embodiments of this disclosure.

For example, FIG. 2A illustrates an example of a user interface for an interactive application at an electrically switchable glass 136 of a vehicle, in accordance with one or more embodiments of this disclosure. In the example of FIG. 2A, the electrically switchable glass 136 is located on a front windscreen 200 of the vehicle. The first image may be projected onto the electrically switchable glass 136. In this example, the first image includes a prompt "Please enter your PIN" 212 and interactive elements 214.

According to some embodiments, the interactive application system 110 may use the imaging device(s) 120 to determine a user (e.g., vehicle passenger) contact with a portion of the electrically switchable glass corresponding to an interactive element. For example, one or more images obtained using the imaging device(s) 120 may indicate that a user pressed a portion of the electrically switchable glass that corresponds to a specific element, e.g., because the specific element is projected onto that portion of the electrically switchable glass. For example, the user may touch portions of the electrically switchable glass 136 corresponding to the interactive elements "2," "3," "1," and "4".

The interactive application system 110 may then transmit, to the remote server, based on the portion of the electrically switchable glass, an indication of the interactive element for triggering execution of one or more commands by the interactive application. For example, in response to the user touching the portion of electrically switchable glass 136 corresponding to the interactive elements "2," "3," "1," and "4," the communication subsystem 112 may transmit to the remote server, an indication of the interactive element (e.g., the input PIN of the user) for triggering execution of one or more commands by the interactive application, e.g., confirming whether or not the input PIN is correct.

Alternatively, or additionally, the interactive application system 110 may use the imaging device(s) 120 to determine a gesture of a user (e.g., vehicle passenger). For example, the interactive application system 110 may use gesture recognition techniques to detect and interpret human gestures such as using computer vision (CV) and machine learning techniques. The interactive application system 110 may use time-sequential (e.g., time-series) images to detect movement of hands, arms, face, body, etc. of a user. The gesture of the user may correspond to a user instruction. For example, one or more images obtained using the imaging device(s) 120 may indicate that a user made a swiping motion, which may correspond to a user instruction to go back to a previous screen. In some examples, the gesture of the user may be a user pointing, such as to an interactive element, and may correspond to a user instruction to select the interactive element. The interactive application system 110 may then transmit, to the remote server, based on the one or more gestures, the user instruction for triggering execution of one or more commands by the interactive application. For example, the gesture may include a swiping motion, and the corresponding user instruction may be to go back to a previous screen. The interactive application system 110 may then transmit to the remote server the instruction to trigger execution of a command to return to a previous screen.

The interactive application system 110 may receive, from the remote server, based on execution of the one or more commands by the interactive application, second data corresponding to the interactive application. For example, as a result of inputting the PIN, the remote server may then send data regarding a next image for projecting. For example, if the PIN is incorrect the remote server may transmit information to the interactive application system 110 that next image that is projected should indicate to the user to re-enter their PIN. If the PIN is correct, the remote server may transmit information to the interactive application system 110 that the next image that is projected should exhibit to the user, one or more actions the user can choose regarding their account. The interactive application system 110 may then use this information to generate a second image for projection, using techniques described herein.

Figure 2B:
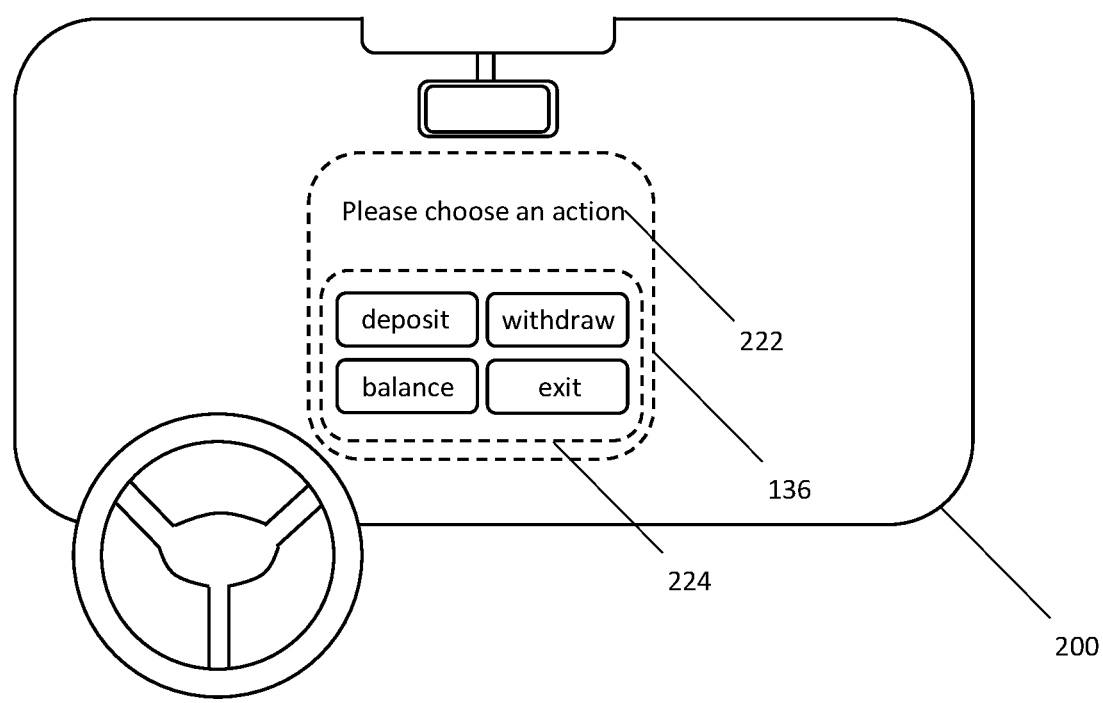
FIG. 2B illustrates another example of a user interface for an interactive application at an electrically switchable glass of a vehicle, in accordance with one or more embodiments of this disclosure.

For example, FIG. 2B illustrates the next image projected, using the image projector device, onto the electrically switchable glass 136 of a vehicle 130, in accordance with one or more embodiments of this disclosure. The next projected image includes a prompt "Please choose an action" 222 and interactive elements 224 exhibiting actions a user can take, such as "deposit", "balance", "withdraw", and "exit."

According to some embodiments, the interactive application system 110 may be configured to enable audio communication with the vehicle through an audio system of the vehicle, such as through an internal and external speaker and microphone of the vehicle. For example, in response to detecting the vehicle, the process may include activating a wireless short-range communication session with the vehicle. Short-range communication sessions may include Bluetooth, Wi-Fi, NFC, RFID, ZigBee, and/or the like. The interactive application system 110 may then transmit to the vehicle, e.g., via the wireless short-range communication session, audio data in a format configured to be decoded by the vehicle. For example, the audio data may include clips of audio such as music, sound effects, ambient sounds, and/or the like which may be played for the user by an audio system (e.g., internal speakers, external speakers, etc.) of the vehicle when the audio data is received and decoded by the vehicle. Alternatively, or additionally, the audio data may include speech or voice recordings, which may indicate to the user different instructions and/or the like. For example, the audio data may be an audio clip prompting the user to "Please enter your PIN."

In some embodiments, an internal or external microphone may be used to detect a user's voice and/or speech. A user may interact through verbal commands to indicate one or more commands for execution by the interactive application. In some examples, the vehicle audio system may be configured to listen for a verbal command, e.g., in response to a prompt to the user presented through the projected image, or through audio played for the user via the vehicle audio system. For example, once the vehicle plays audio data as a result of receiving and decoding the audio data, such as a prompt to "select an action," an internal or external microphone of the vehicle may be configured to detect when a user in the vehicle indicates one or more commands for execution by the interactive application verbally, such as by speaking "start," or "place order." In the example provided herein, the user may respond verbally to a prompt such as "Please enter your PIN" by speaking aloud one or more numbers. The interactive application system 110 may then receive from the vehicle, e.g., via the wireless short-range communication session, one or more commands for execution by the interactive application and transmit the one or more commands for execution by the interactive application.

In some examples, such as when audio communication with the vehicle is at least partially unavailable (e.g., microphone is not enabled, is not functional, or not provided as an option), a user may be presented with an option to project a keyboard (e.g., QWERTY keyboard, numeric keypad, etc.) onto the electrically switchable glass. The user may interact with the projected keyboard using techniques described herein. For example, each of the keys of the projected keyboard may be an interactive element of the interactive application, and a user contact (e.g., as determined using at least one imaging) with a portion of the electrically switchable glass corresponding to an interactive element may cause the system to transmit, to the remote server, based on the portion of the electrically switchable glass, an indication of the interactive element for triggering execution of one or more commands by the interactive application.

In some examples, rather than verbal communication or contact with the interactive element, the user may use a device connected to the vehicle, such as a keyboard or mouse, connected to the vehicle system via wired or wireless connection, to interact with the interactive element.

According to some embodiments, the interactive application may include one or more authentication processes as part of the interactive application. For example, when the interactive application is initiated, the system may prompt the user to authenticate themselves and/or their vehicle. The interactive application system 110 may prompt the user via an image projected onto the electrically switchable glass, or via a message to another device of the user (e.g., mobile device, screen of the vehicle, etc.). The user may authenticate themselves using a password (e.g., input via interactive elements of the projected image), using multi-factor authentication, certificate-based authentication, biometric authentication, and/or the like. In other examples, the user may authenticate the vehicle, or the vehicle may be authenticated by the interactive application system. In one example, the imaging device(s) 120 may be used by the system to retrieve images of the user and/or vehicle. The system may then use facial recognition techniques, or optical character recognition to recognize a user and/or a license plate number of the vehicle. The system may compare information that the user inputs or information the system determines regarding the user/vehicle to information obtained from a remote server to determine if the user and/or vehicle is an authorized user and/or vehicle.

Alternatively, or additionally, the interactive application system 110 may only initiate the interactive application in response to determining whether one or more conditions are met. The one or more conditions may include determining that a vehicle is within a location configured for the interactive application, authenticating that a vehicle and/or user is an authorized user (e.g., using techniques described above), and/or the like.

Figure 3:
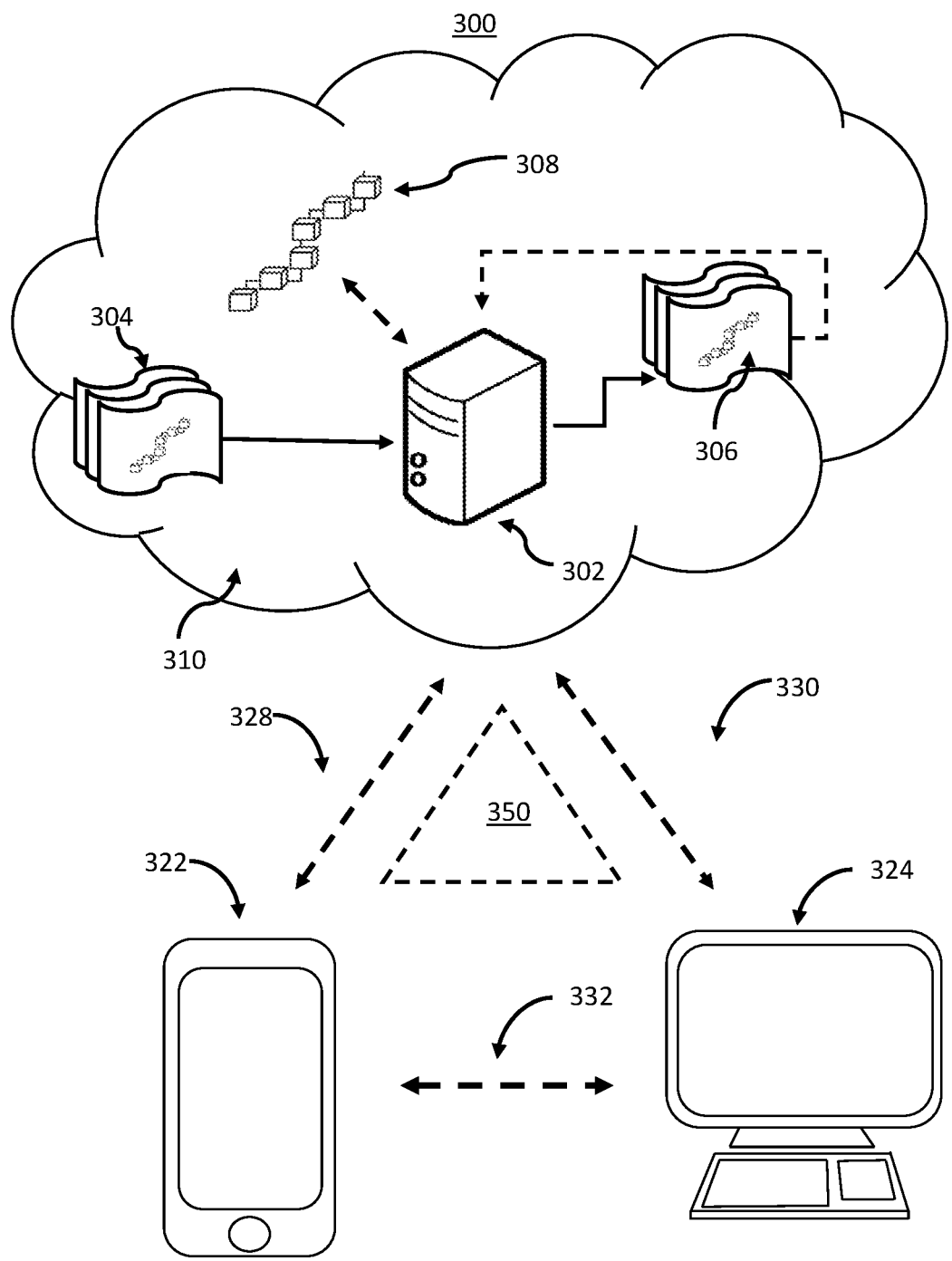
FIG. 3 shows illustrative components for a system used to trigger at least a portion of electrically switchable glass of a vehicle, in accordance with one or more embodiments.

FIG. 3 shows illustrative components for a system used for location-based triggering of an electrically switchable glass of a vehicle, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or a user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include aspects of interactive application system 110, such as communication subsystem 112, processing subsystem 114, machine learning subsystem 116, remote server 140, and database(s) 142.

Cloud components 310 may access blockchain network 308 (e.g., which in some embodiments may correspond to a blockchain). Additionally, cloud components 310 may access database(s) 142 and remote server 140.

Cloud components 310 may include model 302, which may be a machine learning model, artificial intelligence model, deep learning model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., parameters of electrically switchable glass).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, the model (e.g., model 302) may automatically perform actions based on outputs 306. In some embodiments, the model (e.g., model 302) may not perform any actions. The output of the model (e.g., model 302) may be used to determine different parameters of electrically switchable glass of a vehicle such as position and orientation.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
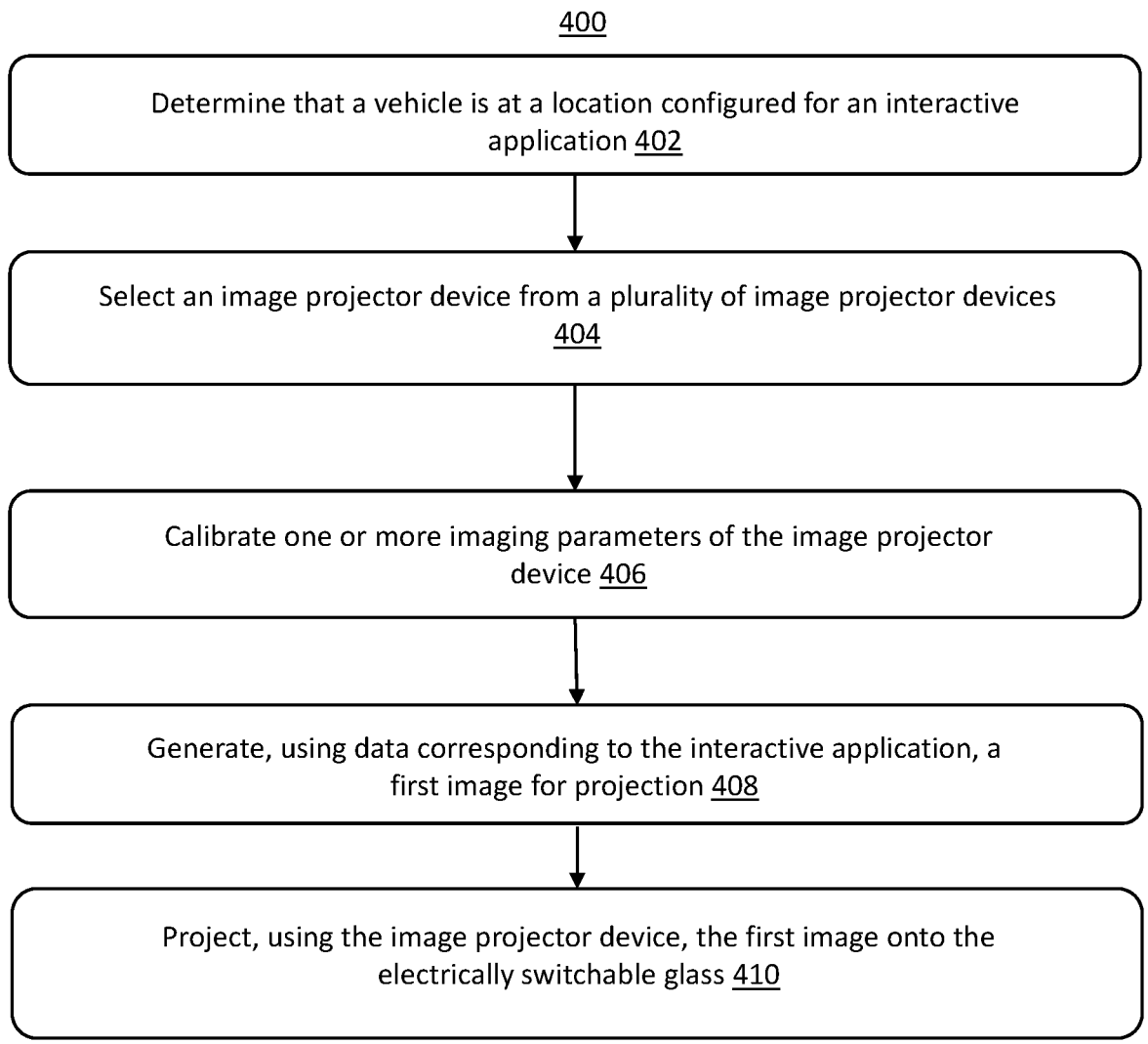
FIG. 4 is a flowchart of operations for location-based triggering of an electrically switchable glass of a vehicle, in accordance with one or more embodiments of this disclosure.

FIG. 4 shows a flowchart of the steps involved in location-based triggering of an electrically switchable glass 136 of a vehicle 130. For example, the system may use process 400 (e.g., as implemented on one or more system components described above with respect to FIG. 1 or FIG. 3) in order to enable interactive applications using electrically switchable glass (e.g., smart glass, private glass, etc.) of a vehicle. Interactive applications may include computer programs that allow users to interact through a user interface (e.g., input devices, etc.). Interactive applications could include applications for vehicle drive-through experiences (e.g., pharmacy, ATM, fast food restaurants, etc.).

At step 402, process 400 may determine that a vehicle is at a location configured for an interactive application. In some embodiments, a location configured for an interactive application may be a location where the vehicle is visible on one or more imaging devices of the interactive application system, a location where the user is able to interact with the interactive application (e.g., a location where images can be projected onto the vehicle using one or more projector devices), or another suitable location. The interactive application system 110 may determine that the vehicle is at a location configured for an interactive application in a variety of ways.

For example, the system may obtain, using the at least one imaging device (e.g., imaging device(s) 120), an image of the vehicle. The system may determine that the vehicle is at a location configured for an interactive application simply by detecting a presence of the vehicle in the image(s). In some examples, the interactive application system 110 may include other sensors and may determine that the vehicle is at the location based on the sensor's output. Sensors may include pressure sensors (e.g., the pressure of a platform on the location may change when a vehicle drives over it), motion sensors (e.g., the motion of a vehicle driving into a location may trigger the sensor), light sensors (e.g., headlights of a vehicle may cause a signal to be output), proximity sensors (e.g., the proximity sensor may determine when an entity is close to a portion of the location), sound sensors, and/or the like. In response to determining from the image(s) or sensor output(s) that the vehicle is at a location configured for an interactive application, the system may transmit a signal for triggering opacity of the electrically switchable glass of the vehicle.

Additionally, or alternatively, rather than triggering opacity of the electrically switchable glass of the vehicle in response to a signal received from the system, the vehicle 130 may trigger opacity of the electrically switchable glass in response to determining that the vehicle 130 is in a location configured for the interactive application. The vehicle 130 may then transmit a signal initiating an interactive application to the interactive application system. The interactive application system may detect that the vehicle is at the location configured for an interactive application by receiving, from the vehicle, the signal initiating the interactive application.

For example, the vehicle 130 may use global navigation satellite systems (GNSS), such as GPS to determine whether or not the vehicle 130 is at a location configured for an interactive application. The vehicle 130 may additionally (or alternatively) use any combination of inertial navigation systems (e.g., accelerometers, gyroscopes), dead reckoning, radar, lidar, cameras, and/or the like, to improve accuracy and/or reliability of their location estimates. The vehicle may then use communication subsystem 132 to transmit a signal initiating an interactive application to the interactive application system 110 (e.g., via communication subsystem 112). The interactive application system 110 may receive the signal initiating the interactive application and use the signal to detect that a vehicle is at a location configured for an interactive application.

At step 404, process 400 may select an image projector device from a plurality of image projector devices. For example, process 400 determines, e.g., based on a position and an orientation of the electrically switchable glass, an image projection device from a plurality of image projector devices. In some examples, selecting an image projector device may include determining an image projector device of the plurality of image projector devices having an angle of projection closest to perpendicular to a plane of the electrically switchable glass of the vehicle.

In some embodiments, information regarding the position and orientation of the electrically switchable glass can be obtained using a trained model (e.g., machine learning model, artificial intelligence model, etc.) such as model 302 described with reference to FIG. 3. The machine learning model may be trained on images of vehicles that have electrically switchable glass and may be trained to recognize a type of vehicle and location(s) of electrically switchable glass on the type of vehicle, and/or a position and orientation of the electrically switchable glass. The interactive application system 110 may process, using a machine learning model of machine learning subsystem 116, an image of the vehicle to obtain information regarding a position and an orientation of the electrically switchable glass of the vehicle. For example, the system may obtain, using at least one imaging device, an image of the vehicle and input, into a machine learning model, the image of the vehicle to obtain information regarding the position and the orientation of the electrically switchable glass of the vehicle. At step 406, process 400 may calibrate one or more imaging parameters of the image projector device. For example, the system may calibrate the one or more imaging parameters based on the position and the orientation of the electrically switchable glass. Calibrating the one or more imaging parameters may include altering an angle of projection of the image projector device, and calibrating a contrast, a brightness, a color saturation, and/or a color hue of the image projector device. Some other examples of imaging parameters include brightness, contrast, color, sharpness, keystone correction, zoom, focus and aspect ratio.

At step 408, process 400 may generate, using data corresponding to the interactive application, a first image for projection. In some examples, the data may be retrieved from a remote server. In some examples, the first image comprises one or more interactive elements associated with corresponding portions of the electrically switchable glass. In some embodiments, an interactive element may be a feature in an interactive application that allows the user to interact with the application in some way. The interactive element may be a button, link, form, slider, or dropdown menu. The interactive elements allow the user to input data and/or make selections. The first image may include one or more interactive elements such as buttons or menus that a user may interact with. For example, the images of FIGS. 2A-B include interactive elements 214 and 224.

At step 410, process 400 may include projecting, using the image projector device (e.g., image projector devices 118A-N), the first image onto the electrically switchable glass 136. In some embodiments, the process 400 may further include determining, using at least one imaging device (e.g., imaging device(s) 120), a user contact with a portion of the electrically switchable glass corresponding to an interactive element. For example, the system may determine that the user contacts the portion if the imaging device(s) 120 obtain one or more images of a user contacting (e.g., touching, contacting using a stylus, etc.) a portion of the electrically switchable glass where an interactive element is projected onto the electrically switchable glass 136.

The process 400 may then include transmitting, to the remote server, based on the portion of the electrically switchable glass, an indication of the interactive element for triggering execution of one or more commands by the interactive application Alternatively, or additionally, the interactive application system 110 may use the imaging device(s) 120 to determine a gesture of a user, e.g., using gesture recognition techniques to detect and interpret human gestures (e.g., using computer vision (CV), machine learning). The interactive application system 110 may use a series of images (e.g., sequential images, time-series of images) to detect movement of hands, arms, face, body, etc. of a user. A gesture of the user may correspond to a user instruction. For example, a swiping motion may correspond to a user instruction to return to a previous screen or a pointing motion may correspond to a user instruction to select an element. The interactive application system 110 may then transmit, to the remote server, based on the one or more gestures, the user instruction for triggering execution of one or more commands by the interactive application.

Additionally, the process 400 may include receiving, from the remote server, based on execution of the one or more commands by the interactive application, second data corresponding to the interactive application and generating, using the second data, a second image for projection. The process 400 may then include projecting, using the image projector device, the second image onto the electrically switchable glass.

According to some embodiments, in response to detecting the vehicle, the process may include activating a wireless short-range communication session with the vehicle. As referred to herein, a wireless short-range communication session may include sessions for Bluetooth, Wi-Fi, NFC, RFID, ZigBee, and/or the like. The interactive application system 110 may then transmit to the vehicle, via the wireless short-range communication session, audio data (e.g., music, sound effects, ambient sounds, and/or the like) in a format configured to be decoded by the vehicle. For example, the audio data may be received and decoded by the vehicle and may additionally be played for the user by an audio system of the vehicle. In some examples, the audio data may include speech or voice recordings, which may indicate to the user different instructions and/or the like. For example, the audio data may be an audio clip prompting the user to "Please enter your PIN."

Once the vehicle plays the audio data upon receiving and/or decoding the audio data, a user in the vehicle may indicate one or more commands for execution by the interactive application using sound as well, such as by speaking "start," or "place order," or alternatively creating a sound indicating a command, such as a snapping or clapping sound. In the example provided herein, the user may respond verbally to a prompt such as "Please enter your PIN" by speaking aloud one or more numbers.

The vehicle may further include a built-in microphone to detect a user's voice and/or speech and transmit the detected audio to the interactive application system 110. The interactive application system 110 may then receive from the vehicle, e.g., via the wireless short-range communication session, the detected audio and determine one or more commands for execution by the interactive application corresponding to the audio. The interactive application system 110 may transmit the one or more commands for execution by the interactive application.

Alternatively, or additionally, the vehicle itself may process the detected audio and determine one or more commands for execution. The vehicle may then transmit, e.g., via the wireless short-range communication session, the determined commands for execution to the interactive application system 110. The interactive application system 110 may transmit the one or more commands for execution by the interactive application.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for location-based triggering of an electrically switchable glass of a vehicle, the method including obtaining, using at least one imaging device, an image of the vehicle; in response to determining from the image that the vehicle is at a location configured for an interactive application, transmitting a signal for triggering opacity of the electrically switchable glass of the vehicle; processing, using a machine learning model, the image of the vehicle to obtain information regarding a position and an orientation of the electrically switchable glass of the vehicle; determining, based on the position and the orientation of the electrically switchable glass, an image projector device of the plurality of image projector devices having an angle of projection closest to perpendicular to a plane of the electrically switchable glass of the vehicle; calibrating, based on the position and the orientation of the electrically switchable glass, one or more imaging parameters of the image projector device; generating, using data corresponding to the interactive application, retrieved from a remote server, a first image for projection; and projecting, using the image projector device, the first image onto the electrically switchable glass of the vehicle.

2. A method for location-based triggering of an electrically switchable glass of a vehicle, the method including determining that a vehicle is at a location configured for an interactive application, wherein the vehicle comprises an electrically switchable glass; selecting, based on a position and an orientation of the electrically switchable glass, an image projector device from a plurality of image projector devices having an angle of projection closest to perpendicular to a plane of the electrically switchable glass of the vehicle; generating, using data corresponding to the interactive application, retrieved from a remote server, a first image for projection comprising one or more interactive elements associated with corresponding portions of the electrically switchable glass; projecting, using the image projector device, the first image onto the electrically switchable glass; determining, using at least one imaging device, a user contact with a portion of the electrically switchable glass corresponding to an interactive element of the one or more interactive elements; and transmitting, to the remote server, based on the portion of the electrically switchable glass, an indication of the interactive element for triggering execution of one or more commands by the interactive application.

3. A method for location-based triggering of an electrically switchable glass of a vehicle, the method including determining that a vehicle is at a location configured for an interactive application, wherein the vehicle comprises electrically switchable glass; determining, based on a position and an orientation of the electrically switchable glass, an image projector device from a plurality of image projector devices having an angle of projection closest to perpendicular to a plane of the electrically switchable glass of the vehicle; calibrating, based on the position and the orientation of the electrically switchable glass, one or more imaging parameters of the image projector device; generating, using data corresponding to the interactive application, retrieved from a remote server, a first image for projection; and projecting, using the image projector device, the first image onto the electrically switchable glass.

4. The method of the preceding embodiment, wherein the first image comprises one or more interactive elements associated with corresponding portions of the electrically switchable glass, wherein the method further comprises: determining, using at least one imaging device, a user contact with a portion of the electrically switchable glass corresponding to an interactive element; and transmitting, to the remote server, based on the portion of the electrically switchable glass, an indication of the interactive element for triggering execution of one or more commands by the interactive application.

5. The method of any of the preceding embodiments, further comprising: receiving, from the remote server, based on execution of the one or more commands by the interactive application, second data corresponding to the interactive application; generating, using the second data, a second image for projection; and projecting, using the image projector device, the second image onto the electrically switchable glass.

6. The method of any of the preceding embodiments, wherein the vehicle is configured to trigger opacity of the electrically switchable glass of the vehicle in response to determining that the vehicle is at the location, wherein detecting the vehicle is at the location comprises receiving, from the vehicle, a signal initiating the interactive application.

7. The method of any of the preceding embodiments, wherein detecting the vehicle comprises identifying the vehicle within the location using at least one imaging device, wherein the method further comprises: in response to detecting the vehicle, transmitting a signal for triggering opacity of the electrically switchable glass of the vehicle.

8. The method of any of the preceding embodiments, further comprising: obtaining, using at least one imaging device, an image of the vehicle; and inputting, into a trained model, the image of the vehicle to obtain information regarding the position and the orientation of the electrically switchable glass of the vehicle.

9. The method of any of the preceding embodiments, wherein calibrating the one or more imaging parameters comprises: altering an angle of projection of the image projector device; and calibrating a contrast, a brightness, a color saturation, and/or a color hue of the image projector device.

10. The method of any of the preceding embodiments, further comprising: in response to detecting the vehicle, activating a wireless short-range communication session with the vehicle; and transmitting, to the vehicle via the wireless short-range communication session, audio data in a format configured to be decoded by the vehicle.

11. The method of any of the preceding embodiments, further comprising: receiving, from the vehicle via the wireless short-range communication session, one or more commands for execution by the interactive application; and transmitting the one or more commands for execution by the interactive application.

12. The method of any of the preceding embodiments, further comprising determining, one or more gestures of a user corresponding to a user instruction; and transmitting, to the remote server, based on the one or more gestures, the user instruction for triggering execution of one or more commands by the interactive application.

13. A tangible, non-transitory, machine-readable medium storing instructions that, when executed by a data processing apparatus, cause the data processing apparatus to perform operations comprising those of any of embodiments 1-12.

14. A system comprising: one or more processors; and memory storing instructions that, when executed by the one or more processors, cause the processors to effectuate operations comprising those of any of embodiments 1-12.

15. A system comprising means for performing any of embodiments 1-12.

16. A system comprising cloud-based circuitry for performing any of embodiments 1-12.

What is claimed is:

1. A system for location-based triggering of an electrically switchable glass of a vehicle, the system comprising:
   at least one imaging device;
   a plurality of image projector devices;
   one or more processors; and
   a non-transitory, computer-readable storage medium storing instructions that, when executed by the one or more processors, cause the one or more processors to perform operations comprising:
      obtaining, using the at least one imaging device, an image of the vehicle;
      in response to determining from the image that the vehicle is at a location configured for an interactive application, transmitting a signal for triggering opacity of the electrically switchable glass of the vehicle;
      processing, using a machine learning model, the image of the vehicle to obtain information regarding a position and an orientation of the electrically switchable glass of the vehicle;
      determining, based on the position and the orientation of the electrically switchable glass, an image projector device of the plurality of image projector devices having an angle of projection closest to perpendicular to a plane of the electrically switchable glass of the vehicle;
      calibrating, based on the position and the orientation of the electrically switchable glass, one or more imaging parameters of the image projector device;
      generating, using data corresponding to the interactive application, retrieved from a remote server, a first image for projection; and
      projecting, using the image projector device, the first image onto the electrically switchable glass of the vehicle.

2. The system of claim 1, wherein the first image comprises one or more interactive elements associated with corresponding portions of the electrically switchable glass, wherein the operations further comprise:
   determining, using the at least one imaging device, a user contact with a portion of the electrically switchable glass corresponding to an interactive element; and
   transmitting, to the remote server, based on the portion of the electrically switchable glass, an indication of the interactive element for triggering execution of one or more commands by the interactive application.

3. A method, the method comprising:
   determining that a vehicle is at a location configured for an interactive application, wherein the vehicle comprises electrically switchable glass;
   determining, based on a position and an orientation of the electrically switchable glass, an image projector device from a plurality of image projector devices having an angle of projection closest to perpendicular to a plane of the electrically switchable glass of the vehicle;
   calibrating, based on the position and the orientation of the electrically switchable glass, one or more imaging parameters of the image projector device;
   generating, using data corresponding to the interactive application, retrieved from a remote server, a first image for projection; and
   projecting, using the image projector device, the first image onto the electrically switchable glass.

4. The method of claim 3, wherein the first image comprises one or more interactive elements associated with corresponding portions of the electrically switchable glass, wherein the method further comprises:
   determining, using at least one imaging device, a user contact with a portion of the electrically switchable glass corresponding to an interactive element; and
   transmitting, to the remote server, based on the portion of the electrically switchable glass, an indication of the interactive element for triggering execution of one or more commands by the interactive application.

5. The method of claim 4, further comprising:
   receiving, from the remote server, based on execution of the one or more commands by the interactive application, second data corresponding to the interactive application;
   generating, using the second data, a second image for projection; and
   projecting, using the image projector device, the second image onto the electrically switchable glass.

6. The method of claim 3, wherein the vehicle is configured to trigger opacity of the electrically switchable glass of the vehicle in response to determining that the vehicle is at the location, wherein detecting the vehicle is at the location comprises receiving, from the vehicle, a signal initiating the interactive application.

7. The method of claim 3, wherein detecting the vehicle comprises identifying the vehicle within the location using at least one imaging device, wherein the method further comprises:
in response to detecting the vehicle, transmitting a signal for triggering opacity of the electrically switchable glass of the vehicle.

8. The method of claim 3, further comprising:
obtaining, using at least one imaging device, an image of the vehicle; and
inputting, into a trained model, the image of the vehicle to obtain information regarding the position and the orientation of the electrically switchable glass of the vehicle.

9. The method of claim 3, wherein calibrating the one or more imaging parameters comprises:
altering an angle of projection of the image projector device; and
calibrating a contrast, a brightness, a color saturation, and/or a color hue of the image projector device.

10. The method of claim 3, further comprising:
in response to detecting the vehicle, activating a wireless short-range communication session with the vehicle; and
transmitting, to the vehicle via the wireless short-range communication session, audio data in a format configured to be decoded by the vehicle.

11. The method of claim 10, further comprising:
receiving, from the vehicle via the wireless short-range communication session, one or more commands for execution by the interactive application; and
transmitting the one or more commands for execution by the interactive application.

12. A non-transitory, computer-readable medium storing instructions that, when executed by one or more processors, cause the one or more processors to perform operations comprising:
determining that a vehicle is at a location configured for an interactive application, wherein the vehicle comprises an electrically switchable glass;
selecting, based on a position and an orientation of the electrically switchable glass, an image projector device from a plurality of image projector devices having an angle of projection closest to perpendicular to a plane of the electrically switchable glass of the vehicle;
generating, using data corresponding to the interactive application, retrieved from a remote server, a first image for projection comprising one or more interactive elements associated with corresponding portions of the electrically switchable glass;
projecting, using the image projector device, the first image onto the electrically switchable glass;
determining, using at least one imaging device, a user contact with a portion of the electrically switchable glass corresponding to an interactive element of the one or more interactive elements; and
transmitting, to the remote server, based on the portion of the electrically switchable glass, an indication of the interactive element for triggering execution of one or more commands by the interactive application.

13. The non-transitory, computer-readable medium of claim 12, wherein the instructions cause the one or more processors to perform operations comprising:
receiving, from the remote server, based on execution of the one or more commands by the interactive application, second data corresponding to the interactive application;
generating, using the second data, a second image for projection; and
projecting, using the image projector device, the second image onto the electrically switchable glass.

14. The non-transitory, computer-readable medium of claim 12, wherein the vehicle is configured to trigger opacity of the electrically switchable glass of the vehicle in response to determining that the vehicle is at the location, wherein detecting the vehicle is at the location comprises receiving, from the vehicle, a signal initiating the interactive application.

15. The non-transitory, computer-readable medium of claim 12, wherein detecting the vehicle comprises identifying the vehicle within the location using the at least one imaging device, wherein the operations further comprise:
in response to detecting the vehicle, transmitting a signal for triggering opacity of the electrically switchable glass of the vehicle.

16. The non-transitory, computer-readable medium of claim 12, wherein operations further comprise:
obtaining, using the at least one imaging device, an image of the vehicle; and
processing, using a machine learning model, the image of the vehicle to obtain information regarding a position and an orientation of the electrically switchable glass of the vehicle.

17. The non-transitory, computer-readable medium of claim 12, wherein the operations further comprise calibrating one or more imaging parameters of the image projector device, comprising:
altering an angle of projection of the image projector device; and
calibrating a contrast, a brightness, a color saturation, and/or a color hue of the image projector device.

18. The non-transitory, computer-readable medium of claim 12, wherein the operations further comprise:
in response to detecting the vehicle, activating a wireless short-range communication session with the vehicle; and
transmitting, to the vehicle via the wireless short-range communication session, audio data in a format configured to be decoded by the vehicle.

19. The non-transitory, computer-readable medium of claim 18, wherein the operations further comprise:
receiving, from the vehicle via the wireless short-range communication session, one or more commands for execution by the interactive application; and
transmitting, the one or more commands for execution by the interactive application.

20. The non-transitory, computer-readable medium of claim 12, wherein the operations further comprise:
determining, one or more gestures of a user corresponding to a user instruction; and
transmitting, to the remote server, based on the one or more gestures, the user instruction for triggering execution of one or more commands by the interactive application.

* * * * *